US009528187B2

(12) United States Patent
Suzuki et al.

(10) Patent No.: US 9,528,187 B2
(45) Date of Patent: Dec. 27, 2016

(54) STEEL SHEET FOR CONTAINERS AND MANUFACTURING METHOD FOR SAME

(75) Inventors: Takeshi Suzuki, Chiba (JP); Norihiko Nakamura, Chiba (JP); Yuka Miyamoto, Kanagawa (JP); Yoichi Tobiyama, Okayama (JP)

(73) Assignee: JFE STEEL CORPORATION, Tokyo (JP)

( * ) Notice: Subject to any disclaimer, the term of this patent is extended or adjusted under 35 U.S.C. 154(b) by 408 days.

(21) Appl. No.: 13/823,441

(22) PCT Filed: Sep. 14, 2011

(86) PCT No.: PCT/JP2011/070984
§ 371 (c)(1),
(2), (4) Date: Apr. 30, 2013

(87) PCT Pub. No.: WO2012/036203
PCT Pub. Date: Mar. 22, 2012

(65) Prior Publication Data
US 2013/0216858 A1 Aug. 22, 2013

(30) Foreign Application Priority Data
Sep. 15, 2010 (JP) ................................ 2010-207345

(51) Int. Cl.
| C23C 30/00 | (2006.01) |
| B32B 15/01 | (2006.01) |
| C23C 22/36 | (2006.01) |
| C23C 28/04 | (2006.01) |
| C25D 5/12 | (2006.01) |
| C25D 5/50 | (2006.01) |
| C25D 3/54 | (2006.01) |
| C25D 7/06 | (2006.01) |
| C23C 2/04 | (2006.01) |
| C25D 9/08 | (2006.01) |

(52) U.S. Cl.
CPC ............. *C23C 30/00* (2013.01); *B32B 15/013* (2013.01); *C23C 2/04* (2013.01); *C23C 22/361* (2013.01); *C23C 28/04* (2013.01); *C25D 3/54* (2013.01); *C25D 5/12* (2013.01); *C25D 5/505* (2013.01); *C25D 7/06* (2013.01); *C25D 7/0614* (2013.01); *C25D 9/08* (2013.01); *Y10T 428/12535* (2015.01)

(58) Field of Classification Search
None
See application file for complete search history.

(56) References Cited

U.S. PATENT DOCUMENTS

| 5,624,480 | A | 4/1997 | Yoshitake et al. |
| 7,294,362 | B2 | 11/2007 | Tanaka et al. |
| 7,749,582 | B2 | 7/2010 | Kurokawa et al. |
| 7,938,950 | B2 | 5/2011 | Kurokawa et al. |
| 8,404,357 | B2 | 3/2013 | Kadowaki et al. |
| 2010/0203355 | A1 | 8/2010 | Kadowaki et al. |
| 2010/0293788 | A1 | 11/2010 | Schoenherr et al. |
| 2011/0300402 | A1* | 12/2011 | Tachiki et al. ................ 428/610 |

FOREIGN PATENT DOCUMENTS

| CA | 2205996 | 5/1996 |
| CN | 1093415 | 10/1994 |
| CN | 101410553 | 4/2009 |
| EP | 2006416 | 12/2008 |
| JP | 54-68734 | 6/1979 |
| JP | 59-083775 | 5/1984 |
| JP | 10-509766 | 9/1998 |
| JP | 2003-201576 | 7/2003 |
| JP | 2004-285380 | 10/2004 |
| JP | 2005-097712 | 4/2005 |
| JP | 2007-119867 A | 5/2007 |
| JP | 2008-50641 | 3/2008 |
| JP | 2009-1851 | 1/2009 |
| JP | 2009-068108 | 4/2009 |
| JP | 2009-249691 | 10/2009 |
| JP | 2010-013728 | 1/2010 |
| WO | 2009068523 | 6/2009 |

OTHER PUBLICATIONS

Japanese Official Action—2011-201751—Oct. 27, 2015.
Vietnamese Official Action—1-2013-00809—Oct. 26, 2015.
CN Office Action dated Mar. 31, 2014; Application No. 201180044309.5.
Colombian Patent Application No. 13-065746 dated Dec. 6, 2013.
TW Office Action dated Feb. 10, 2014; Application No. 100133008.
International Preliminary Report on Patentability dated Apr. 18, 2013 in English translation.
Japanese Official Action—2011-201751—Mar. 24, 2015.

* cited by examiner

*Primary Examiner* — Adam Krupicka
(74) *Attorney, Agent, or Firm* — Young & Thompson

(57) ABSTRACT

A steel sheet for containers that has excellent film adhesion qualities, and has a Zr compound film formed thereupon by immersion in or electrolytic treatment with a solution containing Zr ions, F ions, and hydroxylic acid, the Zr compound film being applied in an amount such that the metal Zr content is 0.1-100 mg/m² and the F content is no more than 0.1 mg/m².

6 Claims, No Drawings

STEEL SHEET FOR CONTAINERS AND MANUFACTURING METHOD FOR SAME

TECHNICAL FIELD

The present invention relates to a metallic sheet that is used after being formed into containers such as cans, in particular to a steel sheet for containers that has excellent adhesiveness with an organic resin such as a plastic film, and a method of manufacturing the same.

BACKGROUND ART

Metallic sheets such as tin-plated steel sheets and electrolytically chromic acid-treated steel sheets called tin-free steel sheets are used for various metallic cans such as beverage cane, food cans, pail cans, and 18-liter cans. Among these, tin-free steel sheets are manufactured by subjecting steel sheets to an electrolytic treatment in a bath containing hexavalent chrome, and are characterized in that they have excellent resin adhesiveness with a coating material or the like.

In recent years, there has been a tendency for usage of hexavalent chrome to be restricted worldwide due to an increase in concern regarding the environment, and an alternative material to the tin-free steel sheet, which is manufactured by using a hexavalent chrome bath, has been requested. As an alternative material to the tin-free steel sheet which does not use chrome, for example, Patent Literature 1 discloses a steel sheet for containers which is subjected to an electrolytic treatment in a tungstic acid solution. In addition, Patent Literature 2 discloses a surface-treated metallic material in which an inorganic surface treatment layer that contains Zr, O, and P as a main component and substantially does not contain a phosphate ion is formed on a surface thereof.

To date, various metallic cans have been manufactured by forming a coating on a metallic sheet such as a tin-free steel sheet and by forming the resultant coated metallic sheet into a can body. However, in recent years, a method in which a laminated metallic sheet (resin-coated metallic sheet), which is obtained by laminating a metallic sheet with a resin such as a plastic film instead of a coating, is formed into a can body, has been frequently used so as to reduce the amount of manufacturing-related waste. In the laminated metallic sheet, it is necessary for the resin and the meal it sheet to tightly adhere to each other. In particular, in a laminated metallic sheet that is used to make a beverage can or a food can, since the neck portion of the can is subjected to drawing and ironing, and after the can has been filled with its contents, the resultant can is subjected to a retort sterilization process, strong resin adhesiveness is required in order for a steel sheet-resin adhesion portion subjected to a high degree of forming not to peel off even in a high-temperature wet environment. As a steel sheet for cans subjected to a high degree of forming, a steel sheet for containers which is excellent in terms of weldability, corrosion resistance and coating material adhesiveness, and furthermore, excellent in terms of film adhesiveness, particularly, film adhesiveness at a highly formed portion (hereinafter, referred to as formed film adhesiveness) has been required.

CITATION LIST

Patent Literature

Patent Literature 1: JP-A-2004-285380
Patent Literature 2: JP-A-2005-97712

SUMMARY OF INVENTION

Technical Problems

An object of the invention is to provide a steel sheet for containers, which is excellent in terms of highly-formed-film adhesiveness.

Solution To Problems

In order to achieve the above-described object, the inventors of the present invention deligently carried out an investigation. As a result, it was found that a Zr compound film which was formed on a steel sheet by immersing or electrolytically treating the steel sheet in a solution containing Zr ions, F ions and a hydroxy acid, is excellent in terms of highly-formed-film adhesiveness, and thus, the invention was accomplished.

(1) A steel sheet for containers having a Zr compound film which is formed on a steel sheet by immersing or electrolytically treating the steel sheet in a solution containing Zr ions, F ions and a hydroxy acid,
wherein the adhesion amount of the Zr compound film is within a range of 0.1 mg/m$^2$ to 100 mg/m$^2$ as an amount of metal Zr and is within a range of 0.1 mg/m$^2$ or less as an amount of F.

(2) The steel sheet for containers retain according to (1), wherein the solution further contains phosphate ions, and the adhesion amount of the Zr compound film is 0.1 mg/m$^2$ to 50 mg/m$^2$ as an amount of P.

(3) The steel sheet for containers according to (1) or (2), wherein the adhesion amount of the Zr compound film is 0.05 mg/m$^2$ to 50 mg/m$^2$ as an amount of C of a hydroxy acid precipitate.

(4) The steel sheet for containers according to any one of (1) to (2),
wherein the steel sheet is a surface-treated steel sheet having a surface treatment layer which contains 5 mg/m$^2$ to 1,000 mg/m$^2$ of Ni or 100 mg/m$^2$ to 15,000 mg/m$^2$ of Sn, on at least one surface thereof.

(5) The steel sheet for containers according to any one of (1) to (4),
wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, and a Sn island plating layer which is the remainder of a Sn plating layer and is not alloyed, the Sn island plating layer being formed by plating 300 mg/m$^2$ to 3,000 mg/m$^2$ of Sn on the underlying Ni layer, and alloying a part or the entirety of the underlying Ni layer and a part of the Sn plating layer by a tin melting treatment.

(6) The steel sheet for containers according to any one of (1) to (5),
wherein the hydroxy acid is at least one selected from among a citric acid, a tartaric acid, a glycolic acid, a lactic acid, a glyceric acid and a mandelic acid.

(7) A method of manufacturing a steel sheet for containers, the method comprising:
forming the Zr compound film on the steel sheet in the solution according to any one of (1) to (6); and then,
washing the resultant steel sheet with water having a temperature of 80° C. or higher.

Advantageous Effect of Invention

According to the invention, it is possible to provide a steel sheet for containers which is excellent in terms weldability, corrosion resistance and coating material adhesiveness, and furthermore, excellent in terms of highly-formed-film adhesiveness; a manufacturing method thereof; and metallic can and can lid using the same.

DESCRIPTION OF EMBODIMENTS

Hereinafter, a steel sheet for containers of the invention will be described in detail.

1. The base sheet that is used in the invention is not particularly limited, and a steel sheet which is commonly used as a container material may be used. The manufacturing method, material, and the like of the base sheet are not particularly limited, and the base sheet is manufactured using processes from a common billet manufacturing process to processes such as hot rolling, acid washing, cold rolling, annealing, and termer rolling. A steel sheet may be used without surface treatment. The base sheet may be provided with a surface treatment layer which contains one or more kinds of Ni and Sn. The method of providing the surface treatment layer is not particularly limited.

2. Surface Treatment

A surface-treated steel sheet has a surface treatment layer containing Sn (tin) or Ni (nickel) on at least one surface of the steel sheet. Although not particularly limited, it is preferable that the surface treatment layer contains 5 mg/m$^2$ to 1,000 mg/m$^2$ of Ni or 100 mg/m$^2$ to 15,000 mg/m$^2$ of Sn for one surface.

Sn exhibits excellent formability weldability and corrosion resistance, and it is preferable that the amount of Sn be 100 mg/m$^2$ or more as an amount of metal Sn to exhibit these effects. It is preferable that 200 mg/m$^2$ or more of Sn be included Lo secure sufficient weldability, and 1,000 mg/m$^2$ or more of Sn be included to secure sufficient formability. The effect of improving formability and weldability due to Sn increases with the adhesion amount of Sn, but since the effect of improving corrosion resistance becomes saturated at 15,000 mg/m$^2$ or more, a adhesion amount of 15,000 mg/m$^2$ or more is economically disadvantageous. Accordingly, it is preferable that the adhesion amount of Sn be 15,000 mg/m$^2$ or less as an amount of metal Sn. In addition, a Sn alloy layer is formed by performing a reflow treatment after Sn plating, thereby corrosion resistance is further improved.

Ni exhibits an effect on coating material adhesiveness, film adhesiveness, corrosion resistance and weldability, and thus it is preferable that 5 mg/m$^2$ or more of Ni be contained as metal Ni. The effect of improving excellent film adhesiveness, corrosion resistance and weldability due to Ni increases with increasing adhesion amount of Ni, but since the improvement effect becomes saturated at 1,000 mg/m$^2$ or more, a adhesion amount of 1,000 mg/m$^2$ or more is economically disadvantageous. Furthermore, it is preferable that the adhesion amount of Ni be set to 10 mg/m$^2$ or more and 1,000 mg/m$^2$ or less as an amount of metal Ni.

Specifically, the surface treatment layer is preferably a plating layer composed of Ni or Sn, From the viewpoint of a uniform coating property of a chemical film containing Zr that is formed on the plating layer, the plating layer is preferably a steel sheet having a plating layer which includes an intermediate layer formed from a single layer of an Fe—Sn—Ni alloy layer or an Fe—Sn alloy layer, or an intermediate layer formed from a composite layer of an Fe—Ni alloy layer as the lowest layer and an Fe—Sn—Ni alloy layer formed on en upper surface of the lowest layer, and a metal Sn layer formed on an upper surface of the intermediate layer.

More specifically, the surface-treated steel sheet is a surface-treated steel sheet having an underlying Ni layer which is a Ni plating phase or an Fe—Ni alloy plating phase and contains 5 mg/m$^2$ to 150 mg/m$^2$ of Ni, and a Sn island plating layer which is the remainder of a Sn plating layer that has not been alloyed. The Sn inland plating layer is formed by plating 100 mg/m$^2$ to 3,000 mg/m$^2$ of Sn on the underlying. Ni layer, and alloying a part or the entirety of the underlying Ni layer and a part of the Sn plated layer by a tin melting treatment.

When the adhesion amount of Sn in the plating layer is less than 100 mg/m$^2$, the a tendency for the corrosion resistance to decrease. On the other hand, when the adhesion amount of Sn exceeds 1,000 mg/m$^2$, the plating layer becomes too thick, and thus the advantage of low cost may be lost. The adhesion amount mf Sn may be measured by an electrolytic stripping method or surface analysis fluorescent X-rays.

The tin melting treatment which is performed after the Sn plating has been performed on a steel sheet or a plated steel sheet on which nickel-based plating ha been performed is also referred to as a reflow treatment. After the Sn plating has been performed, the tin melting treatment is performed to obtain surface gloss by raising the temperature to 232° C., which is the melting point of Sn, or higher to melt Sn on the surface of the steel sheet. In addition, when the tin melting treatment is performed, Sn on the surface is melted, the melted Sn is alloyed with the underlying steel sheet or the underlying metal and a Sn—Fe alloy layer or a Sn—Fe—Ni alloy layer is formed, thereby the corrosion resistance of the alloy layer is improved, Furthermore, if the tin melting treatment is appropriately controlled, it is possible to form Sn islands. Thereby, it is possible to manufacture a surface-treated steel sheet having a plating structure in which an Fe—Ni alloy plating layer or an Fe—Ni—Sn alloy plating layer, which does not contain metal Sn and which is excellent in terms of coating material adhesiveness and film adhesiveness, is exposed.

3. Chemical Conversion Coating

A Zr compound film of the invention containing a hydroxy acid and a Zr compound is provided directly on the steel sheet or provided on an upper layer of the surface treatment layer containing one or more kinds of Ni and Sn to obtain a chemical conversion coated steel sheet. Examples of the method of providing the chemical conversion coating include a method in which the steel sheet is immersed in an acidic aqueous solution in which Zr Lone, P ions and a hydroxy acid are dissolved, and a method using a cathode electrolytic treatment. In the immersion treatment, various kinds of films are formed by etching the underlying layer and processing time becomes long. Thus, the immersion treatment is industrially disadvantageous. On the other hand, in the cathode electrolytic treatment, a uniform film can be obtained as a result of forced charge transfer and surface cleaning due to generation of hydrogen on a steel sheet interface and an adhesion promoting effect due to an increase in pH. Furthermore, in the cathode electrolytic treatment, if nitric acid ions and ammonium ions coexist in a treatment liquid, it is possible to promote the precipitation of a Zr compound film, which contains a Zr oxide or Zr—P oxide and which has an excellent effect of improving corrosion resistance or adhesiveness, by performing the treatment for a short period of time from several seconds to several tens of seconds. Thus, the cathode electrolytic treatment is industrially advantageous. Accordingly, in providing the Zr film of the invention, the cathode electrolytic treatment is desirable, and in particular, the cathode electrolytic treatment in a treatment liquid in which nitric acid ions and ammonium ions coexist is preferable.

The Zr compound has a function of securing corrosion resistance and adhesiveness. The Zr compound is considered to be a Zr hydrous oxide composed of a Zr oxide and a Zr hydroxide, and a Zr—P oxide, and these Zr compounds have excellent corrosion resistance and adhesiveness. Accordingly, as the Zr film thickness increases, corrosion resistance or adhesiveness starts to increase, and when the amount of metal Zr becomes 0.1 mg/m$^2$ or more, corrosion resistance and adhesiveness are at levels causing no practical problems. Furthermore, as the amount of Zr film further increases, the effect of improving corrosion resistance and adhesiveness also increases, but when the amount of Zr film as an amount of metal Zr exceeds 100 mg/m$^2$, the Zr film becomes too thick, and thus, the adhesiveness of the Zr film itself deteriorates, and also electrical resistance increases, which results in deterioration of weldability. Therefore, the adhesion amount of the Zr film set within a range of 0.1 mg/m$^2$ to 100 mg/m$^2$ as an amount of metal Zr.

It is preferable that the adhesion amount of the zirconium film be within a range of 0.1 mg/m$^2$ to 9 mg/m$^2$ as an amount of metal zirconium. More preferably, the adhesion amount of the zirconium film is within a range of 1 mg/m$^2$ to 8 mg/m$^2$ as an amount of metal zirconium. If the adhesion amount of the zirconium film is set within this range, it is possible to secure corrosion resistance after a retort treatment has been performed, and also it is possible to obtain a film having high homogeneity and excellent formability.

In addition, when the Zr—P oxide increases, excellent corrosion resistance and adhesiveness are exhibited, and the effect is clearly recognized when the amount of metal P is 0.1 mg/m$^2$ or more. Furthermore, as the amount of a phosphoric acid film increases, the effect of improving corrosion resistance and adhesiveness also increases, but when the amount of the phosphoric acid film exceeds 50 mg/m$^2$ as an amount of P, the phosphoric acid film becomes too thick, and thus, the adhesiveness of the phosphorous film itself deteriorates, and also electrical resistance increases, which results in deterioration of weldability. Therefore, it is preferable that the adhesion amount of the phosphoric acid film be within a range of 0.1 mg/m$^2$ to 50 mg/m$^2$ as an amount of P. It is preferable that the adhesion amount of the phosphoric acid film be within a range of 0.1 mg/m$^2$ to 8 mg/m$^2$ as an amount of metal P. More preferably, the adhesion amount of the phosphoric arid film is within a range of 1 mg/m$^2$ to 6 mg/m$^2$ as an amount of metal P. If the adhesion amount of the phosphoric acid film is set within a range of 1 mg/m$^2$ to 6 mg/m$^2$, it s possible to secure corrosion resistance after retort treatment, and also is possible to obtain a film having high homogeneity.

The solution for forming the chemical conversion coating used in the invention is characterized in that it contains a hydroxy acid. Hydroxy acid is a general term for an organic compound having a carboxyl group and an alcoholic hydroxyl group in one molecule, and at least one kind of acid selected from among a citric acid, a tartaric acid, a glycolic acid, a lactic acid, a glyceric acid, a mandelic acid, and the like, may be used in the invention. When the steel sheet is immersed or electrolytically treated in the solution of the invention, a precipitate of the hydroxy acid is generated together with the Zr compound on the steel sheet. In the adhesive film of the invention, since the precipitate of the hydroxy acid composes the film together with the Zr compound, the highly-formed film adhesiveness thereof is high.

When the adhesion amount of hydroxy acid precipitate is less than 0.05 mg/m$^2$ as the amount of C, the effect of improving resin adhesiveness that is coating materiel resin adhesiveness or film adhesiveness is not sufficient, and when the adhesion amount of the hydroxy acid precipitate exceeds 50 mg/m$^2$, cohesive failure occurs in the film, and thus there is a concern that the resin adhesiveness may decrease. Therefore, it is preferable that the adhesion amount of the hydroxy acid precipitate be within a range of 0.05 mg/m$^2$ to 50 mg/m$^2$. In this case, the amount of C contained in the hydroxy acid precipitate may be measured by using TOC (total organic carbon analyzer), and by subtracting the amount of C existing in the steel sheet. It is preferable that the adhesion amount of the hydroxy acid precipitate be within a range of 0.05 mg/m$^2$ to 8 mg/m$^2$ as an amount of C. More preferably, the adhesion amount of the hydroxy acid precipitate is within a range of 0.1 mg/m$^2$ to 6 mg/m$^2$ as an amount of C. When the adhesion amount of the hydroxy acid precipitate is set within this range, the highly-formed film adhesiveness becomes high.

Since F is contained in an aqueous solution for forming a chemical conversion coating, F is introduced into the chemical conversion coating together with the Zr compound. F contained in the film does not have an effect on the coating material adhesiveness or film adhesiveness (primary adhesiveness), but becomes a cause of deteriorating adhesiveness (secondary adhesiveness) or rust resistance, or anti-corrosiveness under the coating film during a high-temperature sterilization treatment such as a retort treatment. This is considered to he because F contained in the film elutes to water vapor or a corrosive liquid, and decomposes a bond with an organic film or corrodes the underlying steel sheet. When the amount of F contained in the film exceeds 0.1 mg/m$^2$, deterioration of these characteristics starts to become apparent. Therefore, it is preferable that the amount of F be set to 0.1 mg/m$^2$ or less. In order that the amount of F may be set to 0.1 mg/m$^2$ or less, after the chemical film is formed, the film is subjected to a washing treatment such as an immersion treatment in warm water or a spray treatment. If the temperature of the treatment is made high or the time of the treatment is made long, the amount of F may be reduced. Accordingly, for the purpose of setting the amount of F contained in the film to 0.1 mg/m$^2$ or less, it is preferable to perform the immersion treatment in warm water of 80° C. or higher, or the spray treatment.

The amount of metal Zr, the amount of P and the amount of F which are contained in the chemical conversion coating related to the invention, maybe measured by a quantative analysis method such as fluorescent X-ray analysis.

In addition, in the treatment liquid of the cathode electrolytic treatment, the concentration of ammonium ions may be appropriately adjusted within a range of approximately 100 mass ppm to 10,000 mass ppm and the concentration of nitric acid ions may be appropriately adjusted within a range of approximately 1,000 mass ppm to 20,000 mass ppm depending on the production facility or production rate (capacity). In the cathode electrolytic treatment, the current density may be set within a range of 0.05 A/dm$^2$ to 50 A/dm$^2$, and the electrolytic time may be set within a range of 0.01 seconds to 10 seconds.

4. Organic Resin Coating (Laminate)

A resin-coated steel sheet may he manufactured from the steel sheet for containers of the invention by coating the chemical conversion coating with a resin. As described above, the steel sheet for containers of the invention exhibits excellent highly-formed-film adhesiveness at a highly formed portion. This is considered to be because the hydroxy acid precipitate has a lot at functional groups and chemically combines with the resin film (organic resin).

Although not particularly limited, examples of the resin which is coated on the original steel sheet for containers or the surface-treated steel sheet include various thermoplastic resins or thermosetting resins. Examples of the resin include olefin based resin films such as polyethylene, polypropylene, ethylene-propylene copolymer, ethylene-vinyl acetate copolymer, ethylene-acryl ester copolymer and ionomer; polyester films such as polybutylene terephthalate; polyamide films such as nylon 6, nylon 6,6, nylon 11, and nylon 12; and non-stretched or bi-axially stretched thermoplastic resin films such as polyvinyl chloride film and polyvinylidene chloride film. In the case where an adhesive is used at the time of lamination, a urethane-based adhesive, an epoxy based adhesive, an acid modified olefin resin-based adhesive, a copolyamide-based adhesive, a copolyester-based adhesive, or the like (thickness: 0.1 μm to 50 μm) is preferably used. Furthermore, as the adhesive, a thermosetting coating material may be applied on a surface-treated steel sheet side or a film side with a thickness ranging from 0.05 μm to 2 μm.

Furthermore, thermoplastic or thermosetting coating materials may be used alone or in a combination of two or more kinds. Examples of the thermoplastic or thermosetting coating materials include a modified epoxy coating material such as phenol epoxy and amino-epoxy; vinyl coating material such as vinyl chloride-vinyl acetate copolymer, vinyl chloride-vinyl acetate saponified copolymer and vinyl chloride-vinyl acetate-maleic anhydride copolymer; modified vinyl coating material such as epoxy modified-, epoxy amino modified- or epoxy phenol modified-vinyl coating material; acrylic coating material; and synthetic rubber-based coating material such as styrene-butadiene-based copolymer.

It is preferable that the thickness of the resin-coating layer be set within a range of 3 μm to 50 μm, and more preferably within a range of 5 μm to 40 μm. This is because when the thickness is smaller than the range, there is insufficient corrosion resistance, and when the thickness exceeds the range, there is a tendency for a problem regarding formability to occur.

Formation of the resin-coating layer on the chemical conversion coated steel sheet of the invention may be performed by arbitrary means. For example, the formation may be performed by an extrusion coating method, a cast film thermal adhesion method, a bi-axially stretched film thermal adhesion method, or the like. In the case of the extrusion coating method, a resin is extrusion-coated on the surface-treated steel sheet in a melted state and is thermally adhered to the steel sheet to form the resin-coating layer. That is, the resin is melted and kneaded by an extruder, and then the resin is extruded from a T-die in a thin film state. The melted resin film that is extruded and the surface-treated steel sheet are made to pass through a pair of laminating rolls to be pressed an integrated with each other while being cooled, and then the resultant steel sheet is quickly cooled. In the case of extrusion-coating multiple resin coating layers, plural extruders for respective layers are used. Resins from respective extruders are made to meet in multiple multi-layer dies, and then the extrusion coating is performed similarly to the case of a single-layer resin. In addition, the surface-treated steel sheet may be made to vertically pass between a pair of laminating and a melted resin web may be supplied to both sides of the surface-treated steel sheet to form a resin-coating layer on both surfaces of the surface-treated steel sheet.

The resin-coated steel sheet obtained is applicable to a three-piece can having a lateral joint or a seamless can (two-piece can). In addition, the resin-coated steel sheet is applicable to an easy open can lid of a stay-on-tab type, an easy open can lid of a full-open type, or the like.

5. Metallic Can and Can Lid

As the method of manufacturing the metallic can, an arbitrary method of manufacturing a can may he used as long as the can is formed from the above -described resin-coated steel sheet. The metallic can may be a three-piece can having a lateral joint, but generally, a seamless can (two-piece can) is preferable. The seamless can may be manufactured by a known forming method such as drawing and re-drawing; bending and stretching by drawing and re-drawing (stretching); bending, stretching and ironing by drawing and re-drawing, or drawing and ironing; and necking of a neck portion, such that the organic resin-coated surface of the resin-coated steel sheet is the inner surface side of the can.

The can lid may be manufactured by an arbitrary known method as long as the can lid is formed from the above-described resin-coated steel sheet. Generally, the can lid may be manufactured by the method of for the easy open can lid of the stay-on-tab type or the easy open can lid of the full-open type.

The above description is given as an example of the embodiment of the invention, and various modifications may be made within the range of claims of the invention.

EXAMPLES

Hereinafter, examples are shown and the invention is described in detail. The invention is not limited thereto.

Surface Treatment Layer on Steel Sheet

A surface treatment layer was provided on a steel sheet having a sheet thickness of 0.17 mm to 0.23 mm by using the following treatment methods (1) to (6), (Treatment Method 1) A base sheet, which was annealed and tempered after cold rolling, was degreased and acid-washed. Then, Sn-plating was performed using a ferrostan bath, whereby a Sn-plated steel sheet was manufactured.

(Treatment Method 2) After cold rolling, Ni-plating was performed using a Watts-bath, and a Ni-diffused layer was formed during annealing, whereby a Ni-plated steel sheet was manufactured.

(Treatment Method 3) A base sheet, which was annealed and tempered after cold rolling, was degreased and acid-washed. Then, Sn-plating was performed using a ferrostan bath, and then a reflow treatment was performed, whereby a Sn-plated steel sheet having a Sn alloy layer was manufactured.

(Treatment Method 4) A base sheet, which was annealed and tempered after cold rolling, was degreased and acid-washed. Then, Fe—Ni alloy plating was performed using a sulfuric acid-hydrochloric acid, bath, and continuously, Sn plating was performed using a ferrostan bath, whereby Ni and Sn-plated steel sheet was manufactured.

(Treatment Method 5) A base sheet, which was annealed and tempered after cold rolling, was degreased and acid-washed. Then, Sn—Ni alloy plating was performed using a sulfuric acid-hydrochloric acid bath, whereby a Ni and Sn-plated steel sheet was manufactured.

(Treatment Method 6)

After cold rolling, a steel base material (steel sheet) having a thickness of 0.17 mm to 0.23 mm was degreased and acid-washed. Then, Ni-plating was performed using a Watts-bath, a Ni-diffused layer was formed by annealing, and Sn-plating was performed using a ferrostan bath. Then, a melting treatment of tin was performed. Whereby, a Sn-plated steel sheet having a Sn—Ni alloy layer was manufactured.

In the case where Sn-plating was performed after Ni-based plating, the state of island-shaped Sn formation was confirmed by observing the surface of the plated steel sheet using an optical microscope, and it was confirmed that islands were entirely formed in Examples 7 and 3.

Method of Forming Chemical Conversion Coating

After providing the surface treatment layer by the above-described treatment, a chemical conversion coating was provided by the following treatment methods.

(A method) The above-described steel sheet was immersed in a treatment liquid in which 4,000 mass ppm of Zr fluoride, 300 mass ppm of phosphoric acid, 700 mass ppm phenol resin and 10,000 mass ppm of ammonium nitrate were dissolved, whereby Zr compound-phenol resins film (comparative example) was formed.

(B method) The above-described steel sheet was immersed in a treatment liquid in which 1,500 mass ppm of Zr fluoride, 400 mass ppm of phosphoric acid, 500 mass ppm of phenol resin and 5,000 mass ppm of ammonium nitrate were dissolved, and a cathode electrolytic treatment was performed, whereby Zr compound-phenol resin film (comparative example) was provided. Current density (A/dm$^2$) and time (second) in the cathode electrolytic treatment are shown in Table 1. The "-" represents not-treated or not-detected in Table.

(C method) The above-described steel sheet was immersed in a treatment liquid in which 1,500 mass ppm to 4,300 mass ppm of zirconium potassium fluoride, 300 mass ppm to 1,500 mass ppm of phosphoric acid, the hydroxy acid shown in Table 1 of the concentration shown in Table 1 and 1,000 mass ppm to 7,000 mass ppm of ammonium nitrate are dissolved, and was cathode-electrolytically treated, whereby a Zr compound-hydroxy acid precipitate film (example) was provided. Current density (A/dm$^2$) and time (second) in the cathode electrolytic treatment are shown in Table 1.

Water Washing Treatment

After the chemical film was formed by the above-described treatment, water-washing treatment was performed at the temperature described in Table 1 to control the amount of F contained in the film.

In the examples, the amount of metal Ni and the amount of metal Sn contained in the surface treatment layer were measured in accordance with a fluorescent x-ray method and were specified using a calibration curve. In addition, the amount of metal Zr, the amount of P and the amount of F contained in the Zr compound film were measured by a quantitative analysis method such as fluorescent X-ray analysis. The amount of C contained in t the hydroxy acid precipitate was measured by using TOC (total organic carbon analyzer), and by subtracting the amount of C existing in the steel sheet.

Performance Evaluation

Performance evaluation related to respective items (A) to (G) shown below was performed with respect to test materials to which the above-described treatment was performed. In highly-formed-film adhesiveness of (A), the peeled area ratio of the examples was less than 1%, and the film adhesiveness was excellent. However, the peeled area ratio in all of the comparative examples was 1% or more, and there was a problem regarding the film adhesiveness at a highly formed portion. With regard to respective items of (B) to (G), similarly to the comparative examples, the examples were excellent.

(A) Highly-Formed-Film Adhesiveness was Evaluated by the Following Test.

An isophthalic acid copolymerization polyethylene terephthalate film having a stretching ratio of 3.1×3.1 at a thickness of 20 μm, a thickness of 25 μm, a copolymerization ratio of 12 mol % and a melting point of 224° C. was laminated on both surfaces of each of the test materials under laminating conditions such that the bi-axial orientation degree (BO value) of he film became 150, that is, under laminating conditions of a steel sheet feeding speed of 40 m/min, a rubber roll nip length of 17 mm, and a time taken from compression to water cooling of 1 sec., whereby the resin-coated steel sheets of the examples and the comparative examples were manufactured. Here, the nip length represents a length of a portion at which the rubber roll and the steel sheet come into contact with each other in a conveyance direction. The resin-coated steel sheet obtained was subjected to drawing and ironing to manufacture a can body, and the neck portion of the can drum of the can body was formed (necking). Then, the can body was subjected to a retort treatment at 120° for 30 minutes, and the state of peeling of the resin film at the neck portion of the can drum was observed. Evaluation was performed based on a peeled area ratio using a five-grade system (A: peeled area ratio is 0%, B: peeled area ratio is less than 1%, C: peeled area ratio is 1% to 2%, D: peeled area ratio exceeds 2%, but is equal to or less than 10%, and E: peeled area ratio exceeds 10%). Results are shown in Table 1.

(B) Formability

A PET film having a thickness of 20 μm was laminated on both surfaces of each of the test materials at 200° C., the resultant test material was subjected stepwise to can manufacturing forming which are drawing and ironing, and cracking, floating and peeling of the film were observed. The shape was evaluated based on area ratios of cracking floating and peeling, and cracking, floating and peeling of the film were not recognized.

(C) Weldability

By using a wire seam welding machine, each of the test materials was welded by changing the current and under a condition of a welding wire speed of 80 m/min. Then, the weldability was comprehensively judged and evaluated based on the size of the appropriate current range including the minimum current value at which a sufficient welding strength is obtained and the maximum current value at which a welding defect such as dust and welding sputter begin to be observed. The appropriate current range of secondary side was 1500 A or more.

(D) Primary Coating Material Adhesiveness

An epoxy-phenol resin was applied to each of the test materials and was baked at 200° C. for 30 minutes. Then, a grid shaped cut was made into the resultant coating film with a depth reaching the steel sheet and an interval of 1 mm, peeling of the coating film was performed with a peeling tape, and the state of peeling was observed. As a result of evaluation based on a peeled area ratio, the peeled area ratio was found to be 0%.

(E) Secondary Coating Material Adhesiveness

An epoxy-phenol resin was applied to each of the test materials and was baked at 200° C. for 30 minutes. Thereafter, a grid-shaped cut was made into the resultant coating film with a depth reaching the steel sheet and an interval of 1 mm, the test material was subjected to a retort treatment at 120° C. for 30 minutes, and drying was performed. Then, peeling of the coated film was performed with a peeling tape, and the state of peeling was observed. As a result of evaluation based on a peeled area ratio with a four-grade system, the peeled area ratio was 0%.

(F) Corrosion Resistance Under Coating Film

An epoxy-phenol resin was applied to each of the materials and was baked at 200° C. for 30 minutes. Then, a cross-cut was made into the resultant coating film with a depth reaching the steel sheet, the test material was immersed in a test liquid which is a mixed liquid of 1.5% by mass of a citric acid-1.5% by mass of salt at 45° C. for 72 hours, and washing and drying were performed. Then, peeling of the coating film was performed with a peeling tape, and the state of corrosion under the coating film at the cross-cut portion and the state of corrosion at a flat sheet portion were observed. As a result of evaluation based on both the width of corrosion under the coating film and the corrosion area ratio of the flat sheet portion, the corrosion width under the coating film was found to be less than 0.2 mm, and the corrosion area ratio of the flat portion was found to be 0%.

(G) Retort Rust Resistance

Each of the test materials was subjected to a retort treatment at 125° C. for 30 minutes, and the degree of rust occurrence was observed. As a result of evaluation based on a rust occurrence area ratio, the rust occurrence area ratio was found to be 0%.

The invention claimed is:

1. A steel sheet for containers providing highly-formed film adhesiveness having a Zr compound film which is formed on a steel sheet by immersing or electrolytically treating the steel sheet in a solution containing Zr ions, F ions and a glycolic acid,
   wherein the adhesion amount of the Zr compound film is within a range of 0.1 mg/m$^2$ to 100 mg/m$^2$ as an amount of metal Zr, and is within a range of 0.1 mg/m$^2$ or less as an amount of F, and is within 1.5 mg/m$^2$ to 50 mg/m$^2$ as an amount of C of a glycolic acid precipitate, and
   after the formation of the Zr compound film, washing the resultant steel sheet with water having a temperature of 80° C. or higher,
   wherein said highly-formed film adhesiveness may be evaluated by laminating said steel sheet with resin-coat, manufacturing the resin-coated steel sheet to a can body by drawing and ironing, and necking the neck portion of the can body to obtain a peeled area ratio of 0% for the resin film at the neck portion of the can drum in a peeling test after a retort treatment conducted at 120° C. for 30 minutes.

TABLE 1

| | | Surface treatment layer | | | Chemical film (Zr, phosphoric acid, organic compound precipitate film) | | | | |
|---|---|---|---|---|---|---|---|---|---|
| | Numbers | Treatment method | Amount of Sn (mg/m$^2$) | Amount of Ni (mg/m$^2$) | Chemical conversion coating forming method | Current density (A/dm$^2$) | Electrolytic time (sec) | Water washing method | Adhesion amount of Zr (mg/m$^2$) |
| Comparative Examples | 1 | 5 | 950 | 120 | A | — | — | 85° C. | 4 |
| | 2 | 1 | 188 | — | B | 2 | 2 | 85° C. | 12 |
| | 3 | 5 | 950 | 120 | A | — | — | 40° C. | 4 |
| | 4 | 1 | 188 | — | B | 2 | 2 | 40° C. | 12 |
| | 5 | 3 | 7800 | 24 | A | — | — | 40° C. | 4 |
| | 6 | 2 | — | 450 | A | — | — | 40° C. | 15 |
| Examples | 1 | 5 | 950 | 120 | C | — | — | 85° C. | 4 |
| | 2 | 1 | 188 | — | C | 2 | 2 | 85° C. | 12 |
| | 3 | 3 | 7800 | 24 | C | 3.5 | 0.4 | 85° C. | 4 |
| | 4 | 3 | 1150 | 15 | C | — | — | 50° C. | 10 |
| | 5 | 2 | — | 950 | C | 28 | 2 | 80° C. | 45 |
| | 6 | 5 | 450 | 290 | C | 60 | 2 | 83° C. | 83 |
| | 7 | 6 | 1000 | 50 | C | 3 | 0.1 | 45° C. | 0.2 |
| | 8 | 6 | 2800 | 50 | C | 5 | 0.2 | 80° C. | 2.1 |

| | | Chemical film (Zr, phosphoric acid, organic compound precipitate film) | | | | | Evaluation |
|---|---|---|---|---|---|---|---|
| | Numbers | Adhesion amount of F (mg/m$^2$) | Adhesion amount of P (mg/m$^2$) | Adhesion amount of C in phenol resin (mg/m$^2$) | Adhesion amount C in hydroxy acid precipitate (mg/m$^2$) | Kind and concentration of hydroxy acid | Highly-formed film adhesiveness |
| Comparative Examples | 1 | 0.01 or less | 1 | 2 | — | — | C |
| | 2 | 0.01 or less | 18 | 15 | — | — | C |
| | 3 | 0.02 | 1 | 2 | — | — | D |
| | 4 | 0.03 | 18 | 15 | — | — | D |
| | 5 | 0.01 or less | 0.2 | 2 | — | — | E |
| | 6 | 0.09 | 24 | 5 | — | — | C |
| Examples | 1 | 0.01 or less | 1 | — | 1.5 | Glycolic acid 2.5 g/l | A |
| | 2 | 0.01 or less | 18 | — | 14 | Glycolic acid 22.1 g/l | A |
| | 3 | 0.01 or less | 18 | — | 14 | Lactic acid 15.0 g/l | B |
| | 4 | 0.09 | 1 | — | 1.5 | Glycolic acid 2.5 g/l | B |
| | 5 | 0.01 or less | 24 | — | 18 | Glycolic acid 21.5 g/l | A |
| | 6 | 0.01 or less | 45 | — | 41 | Glycolic acid 47.5 g/l | A |
| | 7 | 0.01 or less | 0.1 | — | 0.1 | Glycolic acid 0.2 g/l | B |
| | 8 | 0.01 or less | 0.8 | — | 0.5 | Glycolic acid 1.0 g/l | B |

2. The steel sheet for containers providing highly-formed film adhesiveness according to claim 1,
wherein the solution further contains phosphate ions, and the adhesion amount of the Zr compound film is 0.1 mg/m$^2$ to 50 mg/m$^2$ as an amount of P.

3. The steel sheet for containers providing highly-formed film adhesiveness according to claim 2,
wherein the steel sheet is a surface-treated steel sheet having a surface treatment layer which contains 5 mg/m$^2$ to 1,000 mg/m$^2$ of Ni or 100 mg/m$^2$ to 15,000 mg/m$^2$ of Sn, on at least one surface thereof.

4. The steel sheet for containers providing highly-formed film adhesiveness according to claim 2,
wherein the steel sheet is a surface-treated steel sheet having an underlying Ni layer which is a Ni plating layer or an Fe—Ni alloy plating layer and contains 5 mg/m2 to 150 mg/m$^2$ of Ni, and a Sn island plating layer which is a remainder of a Sn plating layer and is not alloyed, the Sn island plating layer being formed by plating 300 mg/m$^2$ to 3,000 mg/m$^2$ of Sn on the underlying Ni layer, and alloying a part or the entirety of the underlying Ni layer and a part of the Sn plating layer by a tin melting treatment.

5. The steel sheet for containers providing highly-formed film adhesiveness according to claim 1, wherein the steel sheet is a surface-treated steel sheet having a surface treatment layer which contains 5 mg/m$^2$ to 1,000 mg/m$^2$ of Ni or 100 mg/m$^2$ to 15, 000 mg/m$^2$ of Sn, on at least one surface thereof.

6. The steel sheet for containers providing highly-formed film adhesiveness according to claim 1,
wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, and a Sn island plating layer which is a remainder of a Sn plating layer and is not alloyed, the Sn island plating layer being formed by plating 300 mg/m$^2$ to 3,000 mg/m$^2$ of Sn on the underlying Ni layer, and alloying a part or the entirety of the underlying Ni layer and a part of the Sn plating layer by a tin melting treatment.

* * * * *